US006170032B1

(12) United States Patent
Izzard

(10) Patent No.: US 6,170,032 B1
(45) Date of Patent: Jan. 2, 2001

(54) PRIORITY ENCODER CIRCUIT

(75) Inventor: Martin J. Izzard, Dallas, TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 08/990,478

(22) Filed: Dec. 15, 1997

Related U.S. Application Data

(60) Provisional application No. 60/033,459, filed on Dec. 17, 1996.

(51) Int. Cl.[7] .............................. G06F 12/00; G06F 13/14; G06F 13/38
(52) U.S. Cl. ......................... 710/244; 710/240; 710/241; 710/243
(58) Field of Search ................................. 710/100, 116, 710/117, 118, 244, 240, 241, 243, 40, 41, 45, 107, 111, 112, 113

(56) References Cited

U.S. PATENT DOCUMENTS

| | | | | |
|---|---|---|---|---|
| 3,921,145 | * | 11/1975 | Emm et al. ......................... | 340/172.5 |
| 4,348,741 | * | 9/1982 | McAlister et al. .................... | 364/900 |
| 5,095,460 | * | 3/1992 | Rodeheffer ........................... | 395/650 |
| 5,267,235 | * | 11/1993 | Thacker ................................ | 370/60 |
| 5,623,672 | * | 4/1997 | Popat .................................... | 395/728 |
| 5,896,539 | * | 4/1999 | Arimilli et al. ....................... | 395/732 |

OTHER PUBLICATIONS

"A Quantitative Comparison of Scheduling Algorithms for Input–Queued Switches*," McKeown, et al., pp. 1–16.

"Achieving 100% Throughput in an Input–Queued Switch," McKeown, et. al., Proceedings of IEEE Infocom '96, vol. 3 Mar. 1996, pp. 296–302.

"Current Integrating Receivers for High Speed System Interconnects", Sidiropoulos, et. al., IEEE Custom Integrated Circuits Conference, May 1995, pp.

"Data Structures and Network Algorithms", R.E. Tarjan, *Society for Industrial and Applied Mathematics*, Pennsylvania, Nov. 1993, pp.

"High Performance Multi–Queue Buffers for VLSI Communication Switches", Tamir, et. al., Proc. of 15th Annual Symposium on Comp. Arch., Jun. 1988, pp. 343–354.

"High Speed Switch Scheduling for Local Area Networks", Anderson, et. al., ACM Trans. *On Computer Systems*, Nov. 1993, pp. 319–352.

"Input Versus Output Queueing on a Space Division Switch", Karol, et. al., *IEEE Trans. Communications*, 35(12) 1987, pp. 1347–1356.

"Precise Delay Generation Using Coupled Oscillators", John Maneatis, *IEEE Journal of Solid State Circuits*, vol. 28, No. 12, Dec. 1993, pp.

"Scheduling Cells in Input–Queued Cell Switches", Nick McKeown, PHD. Thesis, University of California, Berkley, 1995, pp.

"Scheduling Cells in an Input–Queued Switch", McKeown, et. al., *IEE Electronics Letters*, Dec. 1993, pp. 2174–2175.

"Scheduling Multicast Cells in an Input–Queued Switch", Proceedings of IEEE Infocom '96, vol. 3, Mar. 1996, pp. 271–278.

"Multicast Scheduling for Input–Queued Switches", Prabhaker, et al., *IEEE Journal on Selected Areas in Communications*, vol. 15, No. 5, Jun. 1997, pp. 855–866.

* cited by examiner

Primary Examiner—Ayaz R. Sheikh
Assistant Examiner—Rupal D. Dharia
(74) Attorney, Agent, or Firm—Tammy L. Williams; Wade James Brady, III; Frederick J. Telecky, Jr.

(57) ABSTRACT

A priority encoder circuit (10, 60) is provided. The priority encoder circuit (10, 60) includes a plurality of inputs (38, 90) and outputs (40, 92). The number of inputs (38, 90) equals the number of outputs (40, 92), and each input (38, 90) corresponds to one output. Each input (38, 90) receives a signal that indicates whether the input (38, 90) has been selected. The priority encoder circuit (10, 60) also includes circuitry (50, 100) that generates a signal at the output (40, 92) corresponding to the input (38, 90) having the highest priority that receives the selection signal.

22 Claims, 2 Drawing Sheets

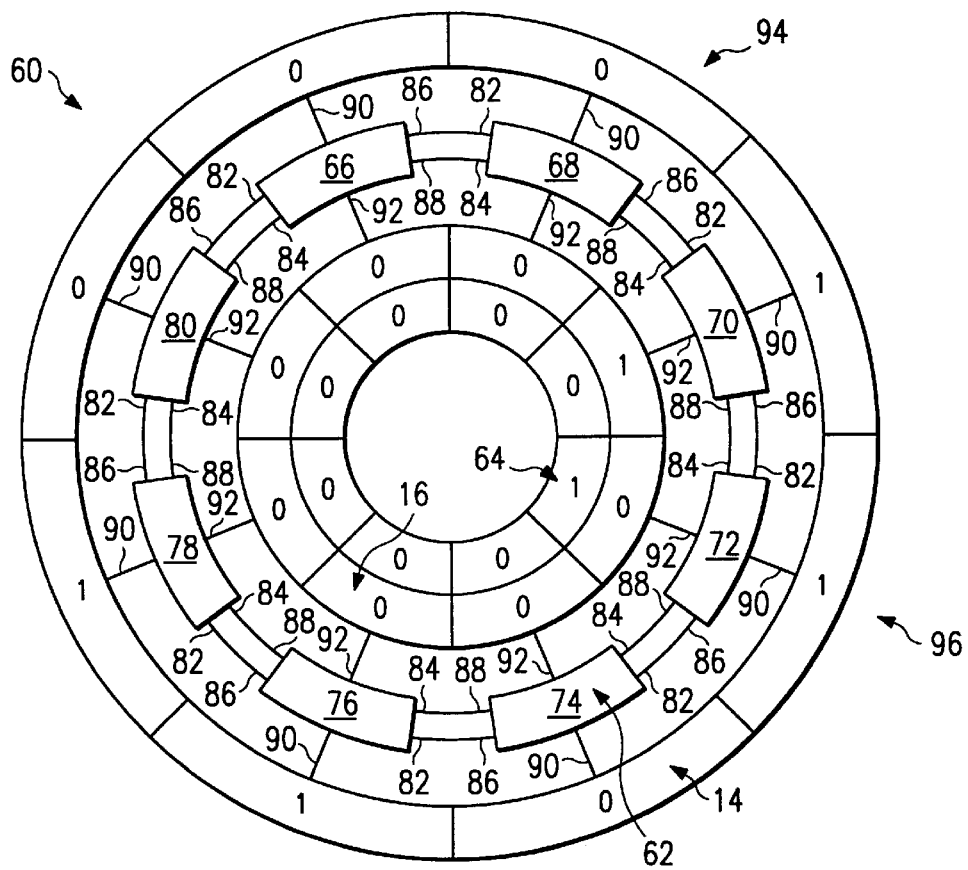
FIG. 3
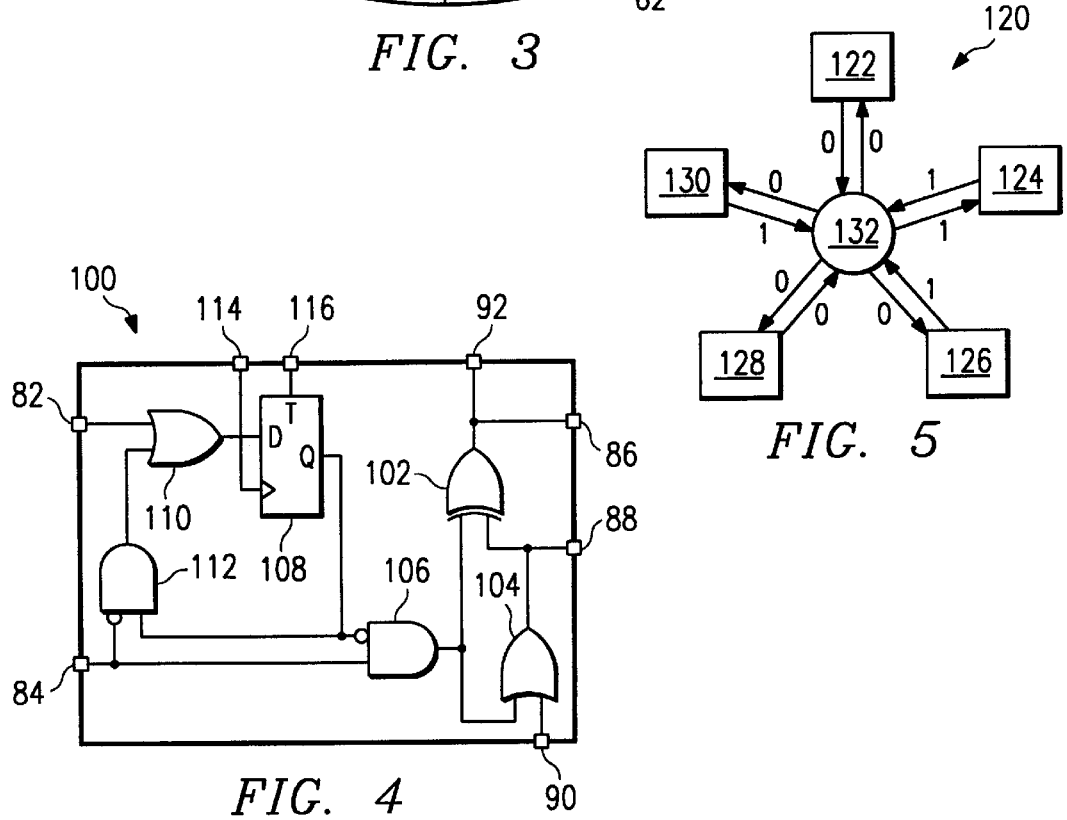
FIG. 4
FIG. 5

PRIORITY ENCODER CIRCUIT

This application claims priority under 35 U.S.C. § 119 (e)(1) of provisional application Ser. No. 60/033,459 filed Dec. 17, 1996.

FIELD OF THE INVENTION

The present invention is directed generally to electronic circuits, and more specifically, to an improved priority encoder circuit.

BACKGROUND OF THE INVENTION

A priority encoder circuit is a logic circuit that is used to receive a number of inputs carrying binary signals, each input having a predetermined priority, and to determine the input with the highest priority carrying a predetermined binary signal. For example, a computer may have several peripheral devices attached to a single input/output port, such as a compact disk read-only memory ("CD ROM") drive, a floppy disk drive, and a tape reader. A priority encoder circuit having three inputs could be used in this application to receive three binary signal inputs, one from each peripheral device, which represent requests for access. The priority encoder circuit generates a binary output signal, such as one, that represents the highest priority input receiving a predetermined binary signal corresponding to a request for access. Input/output port access would then be given to the corresponding device with the highest priority that is requesting access.

For example, if priority was assigned on the basis of data transfer speed, the CD ROM drive would have the highest priority, followed by the floppy disk drive and the tape reader. The priority encoder circuit input coupled to the CD ROM drive would therefore have the highest priority, followed by the inputs coupled to the floppy disk drive and the tape drive, respectively. If the priority encoder circuit inputs indicated that access to the input/output port was requested by all three devices, then the priority encoder circuit would receive three signals representative of a binary one, and would generate an output that indicates that input/output port access should be given to the CD ROM drive. This is typically accomplished by converting the inputs (the "request vector") into outputs (the "grant vector") having a binary value equal to the priority ranking of the highest priority device requesting access.

Thus, request vector inputs to a priority encoder circuit of "1 1 1," "1 1 0," and "1 0 0" (corresponding to a CD ROM drive, a floppy disk drive, and a tape drive request bit) would each yield a grant vector output from the priority encoder circuit of "0 1," where the grant vector contains the binary value for "one," indicating a grant of priority to the device associated with the first bit in the request vector string, i.e., the CD ROM drive. Likewise, request vector inputs of "0 1 1" and "0 1 0" would yield grant vector outputs of "1 0," the binary value for "two," indicating a grant of priority to the device associated with the second bit in the request vector string, i.e., the floppy disk drive. A request vector input of "0 0 1" would yield a grant vector output of "1 1," the binary value for "three," indicating a grant of priority to the device associated with the third bit in the request vector string, i.e., the tape drive.

Several problems have been encountered with priority encoder circuits operating on this principle. One problem is that many logic gate devices must be used to implement the priority encoder circuit. In general, the number of logic devices required to implement known priority encoder circuits increases exponentially with the number of inputs to the priority encoder circuit. Another problem is that the top position, the peripheral device having the highest priority in the preceding example, must remain fixed. If all peripheral devices have the same priority, it is not possible to change the top position in a known priority encoder circuit to ensure that all peripheral devices will get equal access to the input/output port over time.

SUMMARY OF THE INVENTION

Therefore, a need has arisen for a priority encoder circuit that substantially eliminates or reduces the problems associated with known priority encoder circuits.

In particular, a priority encoder circuit is required in which the number of logic devices that must be used to implement the priority encoder circuit does not increase exponentially with the number of inputs, and in which the top position of the request vector is not fixed.

According to one embodiment of the present invention, a priority encoder circuit is provided that includes a plurality of inputs and outputs. The number of inputs equals the number of outputs, and each input corresponds to one output. Each input receives a signal that indicates whether the input has been selected. The priority encoder circuit also includes circuitry that generates a signal at the output corresponding to the input having the highest priority that receives the selection signal.

One important technical advantage of the present invention is that the priority encoder circuit of the present invention may be implemented with a number of logic devices that increases linearly with the number of inputs to the priority encoder circuit.

Another technical advantage of the present invention is a priority encoder circuit that allows the input having the top priority position to be controllably changed, so as to allow more than one input to have top priority over time.

BRIEF DESCRIPTION OF THE DRAWINGS

For a more complete understanding of the present invention and advantages thereof, reference is made to the following description taken in conjunction with the accompanying drawings, in which like reference numbers indicate like features and wherein:

FIG. 3 is an exemplary block diagram of a continuous priority encoder circuit system embodying concepts of the present invention, with representative binary inputs and outputs;

FIG. 4 is an exemplary circuit diagram of a continuous priority encoder circuit bitslice constructed in accordance with the teachings of the present invention; and FIG. 5 is an exemplary computer system embodying concepts of the present invention.

DETAILED DESCRIPTION OF THE INVENTION

Preferred embodiments of the present invention are illustrated in the FIGURES, like numerals being used to refer to like and corresponding parts of the various drawings.

Figure 1:
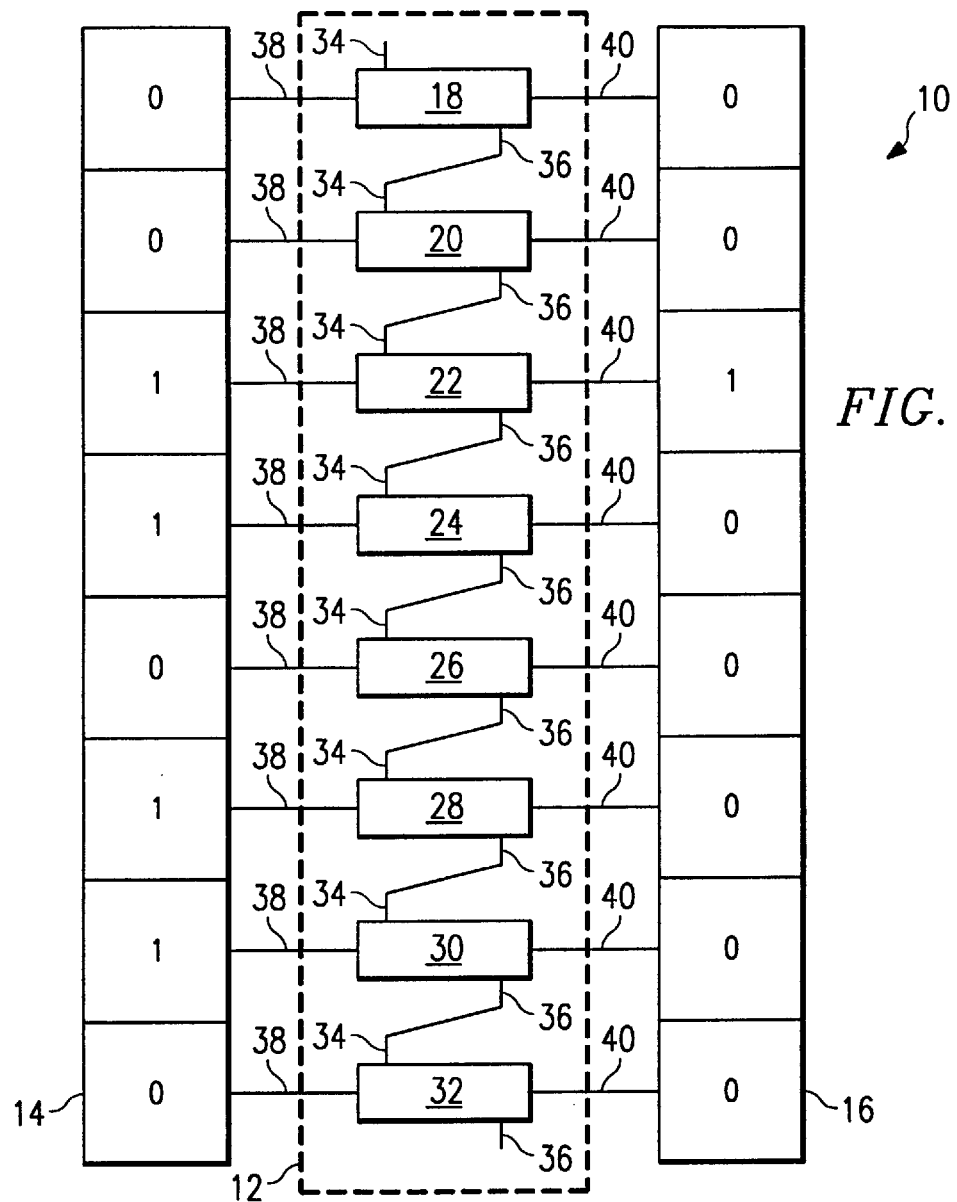
FIG. 1 is an exemplary block diagram of a priority encoder circuit system embodying concepts of the present invention, with representative binary inputs and outputs.

FIG. 1 is an exemplary block diagram of a system 10 of a priority encoder circuit 12 embodying concepts of the present invention, with registers holding representative binary request vector 14 and binary grant vector 16. Priority encoder circuit 12 consists of bitslicte circuits 18 through 32. Each bitslice circuit is a modular logic circuit having a carry input 34, a carry output 36, a request vector input 38, and a grant vector output 40, which receive and generate first signals representative of a binary value of "1," and second signals representative of a binary value of "0." These signals are hereinafter referred to as "1" and "0," respectively.

Input 38 of each bitslice circuit 18 through 32 receives a signal corresponding to a bit of binary request vector 14, and output 40 of each bitslice circuit 18 through 32 is coupled to a corresponding bit of binary grant vector 16. Carry output 36 of each bitslice circuit 18 through 30 is coupled to carry input 34 of the bitslice circuit having the next lowest priority. Thus, bitslice circuit 18 has the highest priority and bitslice circuit 32 has the lowest priority. Carry input 34 for bitslice circuit 18 and carry output 36 for bitslice circuit 32 are not coupled to another bitslice circuit. Carry input 34 of bitslice circuit 18 is tied to "0," and carry output 36 of bitslice circuit 32 is unconnected.

Priority encoder circuit 12 receives binary request vector 14. Vector 14 is shown containing the binary data string "0 0 1 1 0 1 1 0". Priority encoder circuit 12 generates binary grant vector 16 in response to binary request vector 14, which is shown containing the data string "0 0 1 0 0 0 0 0." Binary grant vector 16 has a logical value of "1" in the third-most significant bit, and a logical value of "0" in all other positions. This grant vector indicates that the input having the third highest priority in binary request vector 14 should be granted priority. In contrast, a known priority encoder circuit having eight inputs and three outputs would return a grant vector containing "0 1 1," which has a binary value of "three."

In operation, priority encoder circuit 12 receives input signals corresponding to binary request vector 14, and generates output signals corresponding to binary grant vector 16. Binary grant vector 16 comprises a signal with a logical value of "1" in the position corresponding to the highest priority request, and signals with logical values of "0" in all other positions. Thus, priority encoder circuit 12 uses an edge detection technique instead of the usual decoder/comparator of known priority encoders, and detects the edge occurring between the first "0" to "1" transition in the data stream.

The present invention allows priority encoder circuit 12 to have a bitslice structure, where the number of inputs is equal to the number of outputs. This structure is unlike known priority encoder circuits, where the number of inputs does not equal the number of outputs. If the number of requests in binary request vector 14 is increased, the number of logical devices required to construct priority encoder circuit 12 increases linearly, unlike known priority encoder circuits in which the number of logical devices increases exponentially with the number of inputs. Therefore, an increase in the number of inputs by a factor of two would only result in an increase by a factor of two in the number of logic devices required to construct priority encoder circuit 12 in accordance with the present invention.

One of ordinary skill in the art will recognize that various changes, substitutions, and alterations can be made to priority encoder circuit 12 without departing from the spirit or scope of the invention. For example, the number of bitslices may be increased or decreased. Additional inputs and outputs, such as trigger inputs or clock inputs, may also be added if suitable.

Figure 2:
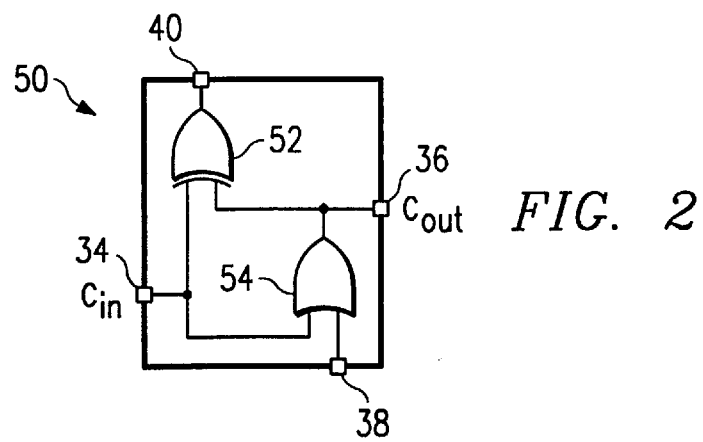
FIG. 2 is an exemplary circuit diagram of a priority encoder circuit bitslice constructed in accordance with the teachings of the present invention.

FIG. 2 is an exemplary circuit diagram of a bitslice circuit 50 usable to construct any or all of the bitslice circuits of priority encoder circuit 12 of FIG. 1. Bitslice circuit 50 includes an EXCLUSIVE OR gate 52 and an OR gate 54. A request vector input 38 and a carry input 34 (Cin) are coupled to the input of OR gate 54. Carry input 34 is also coupled to an input to EXCLUSIVE OR gate 52. The output of OR gate 54 is coupled to the input of EXCLUSIVE OR gate 52 and to a carry output 36 (Cout). The output of EXCLUSIVE OR gate 52 is coupled to a grant vector output 40.

The signals received and generated by bitslice circuit 50 represent binary values, such that a first signal represents "1" and a second signal represents "0." The karnaugh map for bitslice circuit 50 is shown below:

| Input 38/Cin 34 | Cout 36 | Output 40 |
|---|---|---|
| 0 | 0 | 0 | 0 |
| 0 | 1 | 1 | 0 |
| 1 | 0 | 1 | 1 |
| 1 | 1 | 1 | 0 |

Output 40 has a value of "1" only in those cases where the state of input 38 and carry input 34 is "1 0."

The application of bitslice circuit 50 to priority encoder circuit 12 of FIG. 1 therefore requires that a value of "0" be applied to carry input 34 of bitslice circuit 18. The value of carry input 34, carry output 36, and output 40 for the subsequent bitslice circuits in priority encoder circuit 12 would then be "0" until the first bit in binary request vector 14 having a logical value of "1" is applied to an input 38 of bitslice circuit 50. At that bitslice circuit, the value of carry output 36 and output 40 for the corresponding bitslice circuit of priority encoder circuit 12 will become "1," thus forcing the value of each carry input 34 and carry output 36 for the remaining bitslice circuits of lower priority to "1" and output 40 to "0." In this manner, the only bitslice circuit having an output 40 with a value of "1" will be the highest priority bitslice circuit which has an input 38 value of "1."

One of ordinary skill in the art will recognize that various changes, substitutions, and alterations can be made to bitslice circuit 50 without departing from the spirit or scope of the present invention. For example, other logic devices may also be used in place of EXCLUSIVE OR gate 52 and OR gate 54, and additional inputs and outputs, such as trigger inputs or clock inputs, may be also added if suitable. Likewise, bitslice circuit 50 may be designed to output a "0" if it is the highest priority bitslice receiving a "1," or to output either a "1" or "0" if it is the highest priority bitslice receiving a "0."

FIG. 3 is an exemplary diagram of a system 60 of a continuous priority encoder circuit 62 embodying concepts of the present invention, with representative binary request vector 14 and binary grant vectors 16 and 64. Continuous priority encoder circuit 62 consists of bitslice circuits 66 through 80. Each bitslice circuit is a modular logic circuit (such as circuit 100 described below with respect to FIG. 4) having an upper left carry input 82, a lower left carry input 84, an upper right carry output 86, a lower right carry output 88, a request vector input 90, and a grant vector output 92. Input 90 of each bitslice circuit 66 through 80 receives a signal corresponding to a bit of binary request vector 14, and output 92 of each bitslice circuit is coupled to a corresponding bit of binary grant vectors 16 and 64.

Upper right carry output 86 and lower right carry output 88 of each bitslice 66 through 78 are coupled to upper left carry input 82 and lower left carry input 84, respectively, of the bitslice circuit having the next lowest priority. In addition, upper right carry output 86 and lower right carry output 88 of the lowest priority bitslice circuit 80 are coupled to upper left carry input 82 and lower left carry input 84, respectively, of the highest priority bitslice circuit 66, creating a circular ripple carry chain.

Continuous priority encoder circuit 62 receives binary request vector 14, which is shown containing the binary data string "0 0 1 1 0 1 1 0". The binary input associated with bitslice circuit 66 is assigned the top priority, as indicated by arrow 94, with decreasing priority assigned in a clockwise direction to bitslice circuits 68, 70, etc., such that bitslice circuit 80 is assigned the lowest priority.

Continuous priority encoder circuit 62 generates binary grant vector 16 in response to binary request vector 14, which is shown containing the data string "0 0 1 0 0 0 0 0." Binary grant vector 16 has a logical value of "1" in the third-most significant bit, and a logical value of "0" in all other positions. This data string indicates that the binary input having the third highest priority in binary request vector 14 should be granted priority. In contrast, a known priority encoder circuit would return a grant vector containing "0 1 1," which has a binary value of "three."

In operation, continuous priority encoder circuit 62 receives binary request vector 14 that comprises binary inputs arranged linearly from highest priority to lowest priority. Continuous priority encoder circuit 62 generates outputs represented by binary grant vector 16 in response to binary request vector 14. Binary grant vector 16 comprises a value of "1" in the position corresponding to the highest priority request, and values of "0" in all other positions of binary grant vector 16.

After generating the signals of binary grant vector 16, such as after receiving a clock cycle input, continuous priority encoder circuit 62 reassign the top priority to bitslice circuit 72, as indicated by arrow 96. Thus, the value of binary request vector 14 as read beginning with bitslice circuit 72 becomes "1 0 1 1 0 0 0 1." The binary grant vector 64 corresponding to the new binary request vector 14 with the new top priority bitslice indicated by arrow 96 is "1 0 0 0 0 0 0 0." In contrast, a known priority encoder circuit would return a grant vector containing "0 0 1," which has a binary value of "one."

Therefore, the present invention allows continuous priority encoder circuit 62 to have a bitslice structure similar to priority encoder circuit 12. In addition, the present invention allows continuous priority encoder circuit 62 to reassign the top priority bitslice, unlike known priority encoder circuits. Reassigning the next top priority bitslice to the bitslice immediately lower in priority to the bitslice that is presently selected ensures that all bitslices will eventually be selected. In known priority encoder circuits, a continuous priority encoder circuit structure is not possible, which may result in repeated selection of the highest priority bitslice and the exclusion of all other bitslices. In situations where the priority encoder circuit is used to assign a priority to peripheral devices, such as in a network server, repeated selection of the highest priority device and exclusion of all other devices may be undesirable.

One of ordinary skill in the art will recognize that various changes, substitutions, and alterations can be made to continuous priority encoder circuit 62 without departing from the spirit or scope of the invention. For example, the number of bitslice circuits may be increased or decreased. Additional inputs and outputs may also be added if suitable.

FIG. 4 is an exemplary circuit diagram of a bitslice circuit 100 constructed in accordance with the teachings of the present invention. Bitslice circuit 100 is used to construct continuous priority encoder circuit 62 of FIG. 3. Bitslice circuit 100 includes EXCLUSIVE OR gate 102 and OR gate 104, which are connected in a manner similar to EXCLUSIVE OR gate 52 and OR gate 54 of bitslice circuit 50. In addition, bitslice circuit 100 includes AND gate 106, D-type flip-flop 108, OR gate 110 and AND gate 112. The output of AND gate 106 is coupled to an input of EXCLUSIVE OR gate 102 and OR gate 104. The output of D-type flip-flop 108 is inverted and coupled to AND gate 106, and is coupled to an input of AND gate 112 without being inverted. The output of OR gate 110 is coupled to the input to D-type flip-flop 108. The output of AND gate 112 couples to an input to OR gate 110.

Request vector input 90 of bitslice circuit 100 is coupled to an input of OR gate 104. The output of OR gate 104 is coupled to an input of EXCLUSIVE OR gate 102 and to right lower carry output 88. The output of EXCLUSIVE OR gate 102 is coupled to right upper carry output 86 and grant vector output 92. Left upper carry input 82 is coupled to an input to OR gate 110, and left lower carry input 84 is coupled to an input of AND gate 106 and is inverted and coupled to an input of AND gate 112. Clock input 114 and trigger input 116 are coupled to D-type flip-flop 108.

The function of bitslice circuit 100 can be understood by separating the circuit into two stages. The first stage includes EXCLUSIVE OR gate 102 and OR gate 104. The function of the first stage is identical to the karnaugh map for bitslice circuit 50, such that the value of output 92 is only logical "1" when the value of input 90 is logical "1" and the output of AND gate 106 is logical "0."

In the second stage, the output of AND gate 106 is only logical "1" when the output of D-type flip-flop 108 is logical "0" and the input to left lower carry input 84 is logical "1." The inputs to left upper carry input 82 and left lower carry input 84 can have one of four states: "0 0," "0 1," "1 0," or "1 1."

The inputs to left upper carry input 82 and left lower carry input 84 are "0 0" only when no bit in the request vector is "1." In this state, the input to D-type flip-flop 108 is "1" only for the bitslice where the output of D-type flip-flop 108 is presently "1," i.e., the bitslice having the highest priority. Therefore, the bitslice having highest priority during the present clock cycle continues to have the highest priority during the next clock cycle when no input has a value of "1."

The inputs to left upper carry input 82 and left lower carry input 84 cannot be "1 0." This state could only occur if the bitslice with the next highest priority has an output 92 of "1" and an input 90 of "0." Therefore, this state is not possible.

The inputs to left upper carry input 82 and left lower carry input 84 are typically "0 1." If any bitslice has an output 92 value of "1," this state will occur at the inputs to every bitslice except the bitslice having the next lowest priority to the bitslice having an output 92 value of "1." In this state, the output of AND gate 112 is "0," which makes the output of OR gate 110 "0." Therefore, the output value of D-type flip-flop 108 for each of these bitslices will be "0" and the output of AND gate 106 will be "1."

The inputs to left upper carry input 82 and left lower carry input 84 will be "1 1" only at the bitslice having the next lowest priority than the bitslice having an output 92 value of "1." If the bitslice having the output 92 value of "1" is the lowest priority bitslice, then left upper carry input 82 and left lower carry input 84 for the bitslice having the highest priority will be "1 1." In this state, the output of OR gate 110 is "1," thus forcing the output of AND gate 106 to "0" during the next clock cycle. Accordingly, the bitslice having highest priority is reassigned each clock cycle to prevent one bitslice from consistently being selected.

In operation, the highest priority bitslice circuit in request vector 14 during the next clock cycle will always be either the bitslice circuit having the next lower priority than the bitslice circuit with an output 92 value of "1," or the bitslice with the highest priority if the bitslice with the lowest priority has an output 92 value of "1." A different bitslice circuit may be assigned top priority with each clock cycle, which will prevent repeated selection of the highest priority device and exclusion of all other devices.

To ensure that one bitslice circuit 100 will be selected as the highest priority bitslice circuit after startup of continuous priority encoder circuit 62 but before operation, trigger input 116 may be used to reset continuous priority encoder circuit 62. In this configuration, the D-type flip-flop 108 of one bitslice circuit 100 in continuous priority encoder circuit 62 must reset to an output of logical "1" after receiving a trigger signal, whereas the D-type flip-flop 108 of all other bitslice circuits 100 must reset to an output of logical "0."

FIG. 5 is an exemplary computer system 120 embodying concepts of the present invention. Computer system 120 includes systems 122 through 130, which are coupled to packet switch 132. Systems 122 through 130 are computer resources such as microcomputers, workstations, laptops, printers, fax machines, or other suitable systems. Packet switch 132 is a CMOS-based, input-queued, fixed-size packet switch suitable for a wide range of applications, such as a high performance asynchronous transfer mode switch, an INTERNET router, or a fast multiprocessor interconnect. Packet switch 132 comprises a priority encoder such as priority encoder circuit 12 or priority encoder circuit 62.

Switch 132 is operable to receive and transmit data between systems 122 through 130. This data is received at switch 132 asynchronously. If access to switch 132 is to be given preferentially to some of systems 122 through 130, then switch 132 may comprises a priority encoder such as priority encoder circuit 12. Alternatively, if access to switch 132 is to be given equally over time to systems 122 through 130, then switch 132 may comprise a priority encoder such as priority encoder circuit 62.

In operation, systems 122 through 130 request access to switch 132 in order to transmit data to other systems 122 through 130. This request for access is shown by the arrow from each of the systems 122 through 130. For example, the request vector shown in FIG. 5 would be "01101" if the system having highest priority is system 122.

Switch 132 comprises a priority encoder that is operable to assign access to switch 132 to one of systems 122 through 130 based upon the current priority of that system and whether the system is requesting priority. Switch 132 then transfers the data from the system 122 through 130 that has been assigned the highest priority and that is requesting access. In the example described above, the grant vector shown in FIG. 5 is "01000," signifying that system 124 should be granted access to switch 132.

After completion of data transfer, switch 132 may then reassign priority to systems 122 through 130, if switch 132 comprises a priority encoder such as priority encoder circuit 62, or may maintain the previous priority assignment, if switch 132 comprises a priority encoder such as priority encoder circuit 12. For example, if switch 132 comprises a priority encoder such as priority encoder circuit 62, then system 126 would be assigned highest priority. Alternatively, if switch 132 comprises a priority encoder such as priority encoder circuit 12, then system 122 would remain the highest priority system.

One of ordinary skill in the art will recognize that various changes, substitutions, and alterations can be made to bitslice circuit 100 without departing from the spirit or scope of the present invention. For example, other logic devices may also be used in place of the logic gates shown. Furthermore, bitslice circuit 100 may be designed to output a "0" if it is the highest priority bitslice receiving a "1," or to output either a "1" or "0" if it is the highest priority bitslice receiving a "0." Likewise, the top priority position may be designed to move one bitslice clockwise or counterclockwise with each successive clock cycle, or may be randomly assigned.

The present invention thus provides many important technical advantages. A priority encoder circuit embodying concepts of the present invention only requires a number of logical devices that is proportional to the number of inputs to the priority encoder circuit, unlike known priority encoder circuits that require a number of logical devices that increases exponentially with the number of inputs. In addition, the priority encoder circuit of the present invention allows the top priority position to be controllably changed, which will prevent repeated selection of the highest priority device and exclusion of all other devices.

Although the present invention has been described in detail, it should be understood that various changes, substitutions, and alterations can be made hereto without departing from the spirit and scope of the invention as defined by the appended claims.

What is claimed is:

1. A priority encoder circuit comprising:
   a plurality of inputs, each input receiving one of a signal of a first type that indicates the input has been selected and a signal of a second type that indicates the input has not been selected;
   a plurality of outputs, where the number of inputs equals the number of outputs and each input corresponds to one output;
   first circuitry electrically coupled to the inputs and outputs and operable to generate a predetermined signal at the output that corresponds to the input with a selected priority that is receiving the signal of the first type;
   wherein the first circuitry further comprises a plurality of bitslice circuits, wherein the number of bitslice circuits equals the number of inputs, each bitslice circuit electrically coupled to one of the plurality of inputs and one of the plurality of outputs; and
   wherein each bitslice circuit further comprises:
      a carry input;
      a carry output; and
      second circuitry coupled to the carry input, the carry output, the one of the plurality of inputs, and the one of the plurality of outputs, the second circuitry operable to generate the signal of the first type at the carry output and the one of the plurality of outputs when the one of the plurality of inputs receives the signal of the first type and the carry input receives the signal of the second type.

2. The priority encoder circuit of claim 1 wherein the second circuitry further comprises:
   an OR gate having a first input coupled to the one of the plurality of inputs and a second input coupled to the carry input of the bitslice circuit; and
   an EXCLUSIVE OR gate having a first input coupled to the carry output of the bitslice circuit and an output of the OR gate, a second input coupled to the carry input of the bitslice circuit, and an output coupled to the one of the plurality of outputs of the bitslice circuit.

3. The priority encoder circuit of claim 1 wherein the second circuitry is further operable to generate the signal of the second type at the one of the plurality of outputs of the bitslice circuit and the carry output of the bitslice circuit when the one of the plurality of inputs and the carry input of the bitslice circuit receive the signal of the first type.

4. The priority encoder circuit of claim 3 wherein the second circuitry is further operable to generate the signal of the second type at the one of the plurality of outputs and the signal of the first type at the carry output when the carry input receives the signal of the second type.

5. The priority encoder of claim 1 wherein a priority is assigned to each bitslice circuit, and the carry input of the bitslice circuit with the highest priority receives the signal of the second type.

6. The priority encoder circuit of claim 5 wherein the carry input of each bitslice circuit other than the bitslice circuit with the highest priority is coupled to the carry output of the bitslice circuit having the next highest priority.

7. A priority encoder circuit comprising:
a plurality of inputs, each input receiving one of a signal of a first type that indicates the input has been selected and a signal of a second type that indicates the input has not been selected;
a plurality of outputs, where the number of inputs equals the number of outputs and each input corresponds to one output;
first circuitry electrically coupled to the inputs and outputs and operable to generate a predetermined signal at the output that corresponds to the input with a selected priority that is receiving the signal of the first type; and
wherein the first circuitry further comprises:
a plurality of bitslice circuits, wherein the number of bitslice circuits equals the number of inputs, each bitslice circuit electrically coupled to one of the plurality of inputs and one of the plurality of outputs;
a first carry input;
a second carry input;
a first carry output;
a second carry output; and
second circuitry coupled to the one of the plurality of inputs, the one of the plurality of outputs, the first carry input, the second carry input, the first carry output, and the second carry output, the second circuitry operable to generate the signal of the first type at the first carry output and the one of the plurality of outputs of the bitslice circuit when the one of the plurality of inputs of the bitslice circuit receives the signal of the first type and the second carry input receives the signal of the second type.

8. The priority encoder circuit of claim 7 further comprising a clock signal output coupled to the second circuitry.

9. The priority encoder circuit of claim 8 wherein each bitslice circuit has an associated priority, and the bitslice circuit receiving the signal of the second type at the first carry input at the end of a first clock cycle has the highest priority during a second clock cycle.

10. The priority encoder circuit of claim 8 wherein a priority is assigned to each bitslice circuit, the first carry input and second carry input of each bitslice circuit is coupled to the first carry output and second carry output, respectively, of the bitslice circuit with the next highest priority, and the first carry output and second carry output of the bitslice circuit with the lowest priority are coupled to the first carry input and second carry input, respectively, of the bitslice circuit with the highest priority.

11. The priority encoder circuit of claim 8 wherein the second circuitry further comprises:
a first OR gate having a first input coupled to the one of the plurality of inputs of the bitslice circuit;
an EXCLUSIVE OR gate having an output coupled to the first carry output and the one of the plurality of outputs of the bitslice circuit and a first input coupled to an output of the first OR gate;
a first AND gate having an output coupled to a second input of the first OR gate and a second input of the EXCLUSIVE OR gate;
a second AND gate having an inverted input coupled to the second carry input of the bitslice circuit;
a second OR gate having a first input coupled to the first carry input of the bitslice circuit and a second input coupled to an output of the second AND gate; and
a D-type flip-flop having a trigger input, a clock input coupled to the clock signal output, a D input coupled to an output of the second OR gate, and a Q output coupled to an uninverted input of the second AND gate and coupled to an inverted input of the first AND gate.

12. A method for selecting one of a plurality of inputs comprising the steps of:
receiving a request vector of a plurality of binary data bits, each bit having a predetermined priority ranging from a highest priority bit to a lowest priority bit, each bit having one of a first and a second value;
generating an output vector of a plurality of binary data bits, the output vector having one bit of a third value corresponding to the highest priority bit of the request vector having the first value, wherein the number of binary data bits of the request vector is equal to the number of binary data bits of the output vector; and
wherein the step of generating further comprises the steps of:
generating the third value at a first output and a second output of a bitslice circuit and a fourth value at a third output of the bitslice circuit if a first input and a third input of the bitslice circuit is the first value and a second input is the second value; and
generating a fourth value at the first output and second output of every other bitslice, circuit.

13. A method for selecting one of a plurality of inputs comprising the steps of:
receiving a request vector of a plurality of binary data bits, each bit having a predetermined priority ranging from a highest priority bit to a lowest priority bit, each bit having one of a first and a second value;
generating an output vector of a plurality of binary data bits, the output vector having one bit of a third value corresponding to the highest priority bit of the request vector having the first value, wherein the number of binary data bits of the request vector is equal to the number of binary data bits of the output vector;
receiving a clock signal input; and
assigning a new priority to each binary data bit after each clock cycle of the clock signal input by assigning the highest priority to the bit having the next lowest priority than the bit of the output vector having the third value and corresponding to the highest priority bit of the request vector having the first value.

14. A method for selecting one of a plurality of inputs comprising the steps of:

receiving a request vector of a plurality of binary data bits, each bit having a predetermined priority ranging from a highest priority bit to a lowest priority bit, each bit having one of a first and a second value;

generating an output vector of a plurality of binary data bits, the output vector having one bit of a third value corresponding to the highest priority bit of the request vector having the first value, wherein the number of binary data bits of the request vector is equal to the number of binary data bits of the output vector;

receiving the request vector at a plurality of bitslice circuits, wherein each bitslice circuit has a unique priority and receives one bit of the request vector; and transmitting data from a first bitslice circuit to a second bitslice circuit with a lower priority.

15. A method for selecting one of a plurality of inputs comprising the steps of:

receiving a request vector of a plurality of binary data bits, each bit having a predetermined priority ranging from a highest priority bit to a lowest priority bit, each bit having one of a first and a second value;

generating an output vector of a plurality of binary data bits, the output vector having one bit of a third value corresponding to the highest priority bit of the request vector having the first value, wherein the number of binary data bits of the request vector is equal to the number of binary data bits of the output vector;

receiving the request vector at a plurality of bitslice circuits, wherein each bitslice circuit has a unique priority and receives one bit of the request vector;

transmitting data from a first bitslice circuit to a second bitslice circuit with a lower priority; and transmitting a predetermined constant signal to a bitslice circuit having a highest priority.

16. A method for selecting one of a plurality of inputs comprising the steps of:

receiving a request vector of a plurality of binary data bits, each bit having a predetermined priority ranging from a highest priority bit to a lowest priority bit, each bit having one of a first and a second value; and generating an output vector of a plurality of binary data bits, the output vector having one bit of a third value corresponding to the highest priority bit of the request vector having the first value, wherein the number of binary data bits of the request vector is equal to the number of binary data bits of the output vector;

receiving the request vector at a plurality of bitslice circuits, wherein each bitslice circuit has a unique priority and receives one bit of the request vector;

transmitting data from each bitslice circuit to a bitslice circuit with a next lowest priority; and transmitting data from a bitslice circuit with a lowest to a bitslice circuit with a highest priority.

17. A method for selecting one of a plurality of inputs comprising the steps of:

receiving a request vector of a plurality of binary data bits, each bit having a predetermined priority ranging from a highest priority bit to a lowest priority bit, each bit having one of a first and a second value;

receiving the request vector at a plurality of bitslice circuits, wherein each bitslice circuit has a unique priority and receives one bit of the request vector;

transmitting data from a first bitslice circuit to a second bitslice circuit with a lower priority;

generating an output vector of a plurality of binary data bits, the output vector having one bit of a third value corresponding to the highest priority bit of the request vector having the first value, wherein the number of binary data bits of the request vector is equal to the number of binary data bits of the output vector;

generating the third value at a first output and a second output of a bitslice circuit if a first input of the bitslice circuit is receiving the first value, and a second input of the bitslice is receiving the second value;

generating a fourth value at the first output and the second output of every other bitslice circuit;

receiving a clock signal input;

assigning a new priority to each binary data bit after each clock cycle of the clock signal input; and assigning the highest priority to the bit having the next lowest priority than the bit of the output vector having the third value and corresponding to the highest priority bit of the request vector having the first value.

18. The method of claim 17 wherein the step of generating further comprises the steps of:

generating a third value at a first output and a second output of a bitslice circuit and a fourth value at a third output of the bitslice circuit if a first input and a third input of the bitslice circuit is the first value and a second input is the second value; and generating a fourth value at the first output and second output of every other bitslice circuit.

19. A system for connecting computer resources comprising:

a packet switch further comprising:

a plurality of ports; and a priority encoder having:

a plurality of inputs, each input receiving one of a signal of a first type that indicates the input has been selected and a signal of a second type that indicates the input has not been selected;

a plurality of outputs, wherein the number of inputs equals the number of outputs and each input corresponds to one output; and first circuitry electrically coupled to the inputs and outputs and operable to generate a predetermined signal at the output that corresponds to the input with a selected priority that is receiving the signal of the first type and wherein the first circuitry comprises a plurality of bitslice circuits, wherein the number of bitslice circuits equals the number of inputs, each bitslice circuit electrically coupled to one of the plurality of inputs and one of the plurality of outputs, and wherein each bitslice circuit further comprises a carry input, a carry output, and second circuitry coupled to the carry input, the carry output, the one of the plurality of inputs, and the one of the plurality of outputs, the second circuitry operable to generate the signal of the first type at the carry output and the one of the plurality of outputs when the one of the plurality of inputs receives the signal of the first type and the carry input receives the signal of the second type;

a plurality of systems of computer resources, each system of computer resources coupled to the packet switch and operable to request access to the packet switch; and the packet switch, operable to grant access to the system of computer resources that is requesting access that has a highest priority.

20. A system for connecting computer resources comprising:
- a packet switch further comprising:
  - a plurality of ports; and
  - a priority encoder having:
    - a plurality of inputs, each input receiving one of a signal of a first type that indicates the input has been selected and a signal of a second type that indicates the input has not been selected;
    - a plurality of outputs, wherein the number of inputs equals the number of outputs and each input corresponds to one output; and
    - first circuitry electrically coupled to the inputs and outputs and operable to generate a predetermined signal at the output that corresponds to the input with a selected priority that is receiving the signal of the first type, the first circuitry comprising:
      - a first carry input;
      - a second carry input;
      - a first carry output;
      - a second carry output; and
      - second circuitry coupled to the one of the plurality of inputs, the one of the plurality of outputs, the first carry input, the second carry input, the first carry output, and the second carry output, the second circuitry operable to generate the signal of the first type at the first carry output and the one of the plurality of outputs of the bitslice circuit when the one of the plurality of inputs of the bitslice circuit receives the signal of the first-type and the second carry input receives the signal of the second type; and
- a plurality of systems of computer resources, each system of computer resources coupled to the packet switch and operable to request access to the packet switch; and
- the packet switch, operable to grant access to the system of computer resources that is requesting access that has a highest priority.

21. A method for switching systems of computer resources comprising the steps of:
- receiving a plurality of inputs from a plurality of systems of computer resources at a packet switch;
- selecting one of the plurality of inputs with a priority encoder having a plurality of inputs and a plurality of outputs, wherein the number of inputs equals the number of outputs, and wherein the selecting step further includes the steps of receiving a request vector of a plurality of binary data bits, each bit having a predetermined priority ranging from a highest priority bit to a lowest priority bit, each bit having one of a first and a second value, and generating an output vector of a plurality of binary data bits, the output vector having one bit of a third value corresponding to the highest priority bit of the request vector having the first value and the number of binary data bits of the request vector is equal to the number of binary data bits of the output vector;
- wherein the generating step of the selecting step further includes the steps of generating the third value at a first output and a second output of a bitslice circuit if a first input of the bitslice circuit is receiving the first value, and a second input of the bitslice is receiving the second value and generating a fourth value at the first output and the second output of every other bitslice circuit; and
- granting packet switch access to the selected system of computer resources.

22. A method for switching systems of computer resources comprising the steps of:
- receiving a plurality of inputs from a plurality of systems of computer resources at a packet switch;
- selecting one of the plurality of inputs with a priority encoder having a plurality of inputs and a plurality of outputs, wherein the number of inputs equals the number of outputs, and wherein the selecting step further includes the steps of receiving a request vector of a plurality of binary data bits, each bit having a predetermined priority ranging from a highest priority bit to a lowest priority bit, each bit having one of a first and a second value, and generating an output vector of a plurality of binary data bits, the output vector having one bit of a third value corresponding to the highest priority bit of the request vector having the first value and the number of binary data bits of the request vector is equal to the number of binary data bits of the output vector;
- wherein the generating step of the selecting step further includes the steps of generating a third value at a first output and a second output of a bitslice circuit and a fourth value at a third output of the bitslice circuit if a first input and a third input of the bitslice circuit is the first value and a second input is the second value and generating a fourth value at the first output and second output of every other bitslice circuit; and
- granting packet switch access to the selected system of computer resources.

\* \* \* \* \*